UNITED STATES PATENT OFFICE.

ADOLPH FRANK, OF CHARLOTTENBURG, GERMANY.

PROCESS OF CEMENTATION.

SPECIFICATION forming part of Letters Patent No. 718,335, dated January 13, 1903.

Application filed June 4, 1900. Serial No. 18,986. (No specimens.)

*To all whom it may concern:*

Be it known that I, ADOLPH FRANK, a subject of the German Emperor, and a resident of Charlottenburg, Germany, have invented certain new and useful Improvements in Cementation of Metals or of Incorporation of Carbon into Metals; and I do hereby declare the following to be a full, clear, and exact description of the invention, such as will enable others skilled in the art to which it appertains to make and use the same.

I have discovered that carbids and oxygen compounds of carbon when mixed at a suitable temperature mutually decompose to form carbon and other decomposition products. By "carbids" I mean the various hydrogen carbids—as, for instance, those known as the acetylene series of hydrocarbons—as well as metallic carbids, and by "oxygen compounds" I mean the two oxids of carbon, as well as organic compounds containing oxygen, that will be so decomposed as to yield as one of the products of decomposition some or all of their constituent carbon.

Acetylene and carbon monoxid or dioxid mixed and passed through heated tubes or the mixture subjected while under pressure to the action of the electric spark yield carbon. Carbids other than hydrogen carbids behave the same—as, for instance, carbids of the metals of the alkalies, alkaline earths, and other metals, such as calcium, aluminium, and barium carbid. It is of course evident that I need not use pure substances; but any such mixture as contain carbids and oxygen compounds of carbon, the essential feature being the presence of a carbid (either hydrogen carbid or a metallic carbid) and an oxygen compound of carbon, which by their mutual decomposition produce carbon, the reactions taking place as follows: with hydrogen carbid, acetylene being given as an example:

$$C_2H_2 + CO = H_2O + 3C.$$

$$C_2H_2 + 3CO = H_2O + CO_2 + 4C.$$

$$2C_2H_2 + CO_2 = 2H_2O + 5C.$$

and with metallic carbids the reactions take place as follows: with calcium carbid:

$$CaC_2 + CO = CaO + 3C.$$

$$CaC_2 + 3CO = CaCO_3 + 4C.$$

$$2CaC_2 + CO_2 = 2CaO + 5C.$$

$$2CaC_2 + 3CO_2 = 2CaCO_3 + 5C.$$

with barium carbid and carbon monoxid:

$$BaC_2 + CO = BaO + 3C.$$

$$BaC_2 + 3CO = BaCO_3 + 4C.$$

with barium carbid and carbon dioxid:

$$2BaC_2 + CO_2 = 2BaO + 5C.$$

$$2BaC_2 + 3CO_2 = 2BaCO_3 + 5C.$$

That these reactions occur as above set forth is proven by experiments, as in each case the yield of carbon is greater than the carbon contained in either the carbid or the oxygen compound used.

I have discovered (and this forms the subject-matter of the present invention) that it is possible to act by the carbon thus split off upon metals by performing the said process of decomposing carbid such as mentioned by the action of oxygen compounds of carbon in the presence of the metals to be acted upon. In this manner it is possible to cement or convert the metals—*e. g.*, iron, silver, or the like In order to further explain the mode of performing the present invention, following examples may be described.

The metal (*e. g.*, iron) to be cemented is brought in a suitable manner into contact with carbid, (for instance, metallic carbid,) and carbon monoxid, carbonic acid, or a gaseous mixture containing these compounds is conducted over the same at a suitable temperature, or gaseous mixtures which contain hydrogen carbid (*e. g.*, acetylene) and carbon monoxid or carbonic acid are allowed to act directly on the metals. This preferably takes place at the usual temperature for cementing. Also another metal than iron may be subjected to the said cementation or incorporation of carbon, splitting off in the process above described. If it is intended to split off the carbon in the presence, e. g., of silver, the process described for the example of iron may be performed in such manner that the desired articles of silver are covered with powder of carbid and then subjected to the action of, e. g., carbon monoxid at about 150° to 200° centigrade. The carbon splitting off passes immediately into the silver and imparts to the same the appearance of so-called "oxidized" silver.

Having now particularly described my invention, what I claim, and desire to secure by Patent, is—

1. In the art of cementing metals, the process which consists in reacting upon a carbid with an oxid of carbon, in the presence of the metal to be cemented and effecting the reaction at a temperature sufficiently high to separate the carbon, substantially as set forth.

2. In the art of cementing metals, the process which consists in subjecting the metal to be cemented to the action of a mixture of acetylene and an oxid of carbon heated to a temperature sufficiently high to separate the carbon from the mixture, substantially as set forth.

In testimony that I claim the foregoing as my invention I have signed my name in presence of two subscribing witnesses.

ADOLPH FRANK.

Witnesses:
   MAX C. STAEHLER,
   WOLDEMAR HAUPT.